United States Patent [19]

Hill

[11] 3,735,284
[45] May 22, 1973

[54] AERODYNAMIC LARGE VOLUME GASEOUS ELECTRIC DISCHARGE SYSTEM

[76] Inventor: Alan E. Hill, Box 5444-A Rte. 5, Albuquerque, N. Mex. 87112

[22] Filed: Mar. 29, 1971

[21] Appl. No.: 128,845

Related U.S. Application Data

[63] Continuation-in-part of Ser. No. 7,935, Feb. 2, 1970.

[52] U.S. Cl. ................... 331/94.5, 330/4.3, 313/204
[51] Int. Cl. ............................. H01s 3/22, H01s 3/09
[58] Field of Search ....................... 330/4.3; 331/94.5

[56] References Cited

UNITED STATES PATENTS

| | | | |
|---|---|---|---|
| 3,577,096 | 5/1971 | Bridges et al. | 331/94.5 |
| 3,391,281 | 7/1968 | Eerkens | 250/199 |
| 3,621,458 | 11/1971 | Cabezas et al. | 331/94.5 |
| 3,491,309 | 1/1970 | Hill | 331/94.5 |

*Primary Examiner*—Ronald L. Wibert
*Assistant Examiner*—R. J. Webster
*Attorney*—Harry A. Herbert, Jr. and Richard J. Killoren

[57] ABSTRACT

A large volume gaseous discharge system such as used in lasers has a plurality of electrodes at one end of the channel. A plurality of separate discharges are established adjacent the plurality of electrodes. A fast-moving gas stream within the channel aerodynamically controls the ion spacial distribution, and therefore indirectly the electron spacial distribution within the channel. In one system the geometry of the system and velocity of the stream are made such that the transit time between the plurality of electrodes at one end of the channel, and an electrode at the other end of the channel, is of the order of the diffusion time from one current stream and the next. In another embodiment rods are positioned to rapidly diffuse the plasma with nozzles provided to further aid in the mixing. A transverse folded optical path is used for laser operation.

15 Claims, 12 Drawing Figures

INVENTOR.
ALAN E. HILL
BY Harry A. Herbert Jr
ATTORNEY
Richard J. Killoe
AGENT

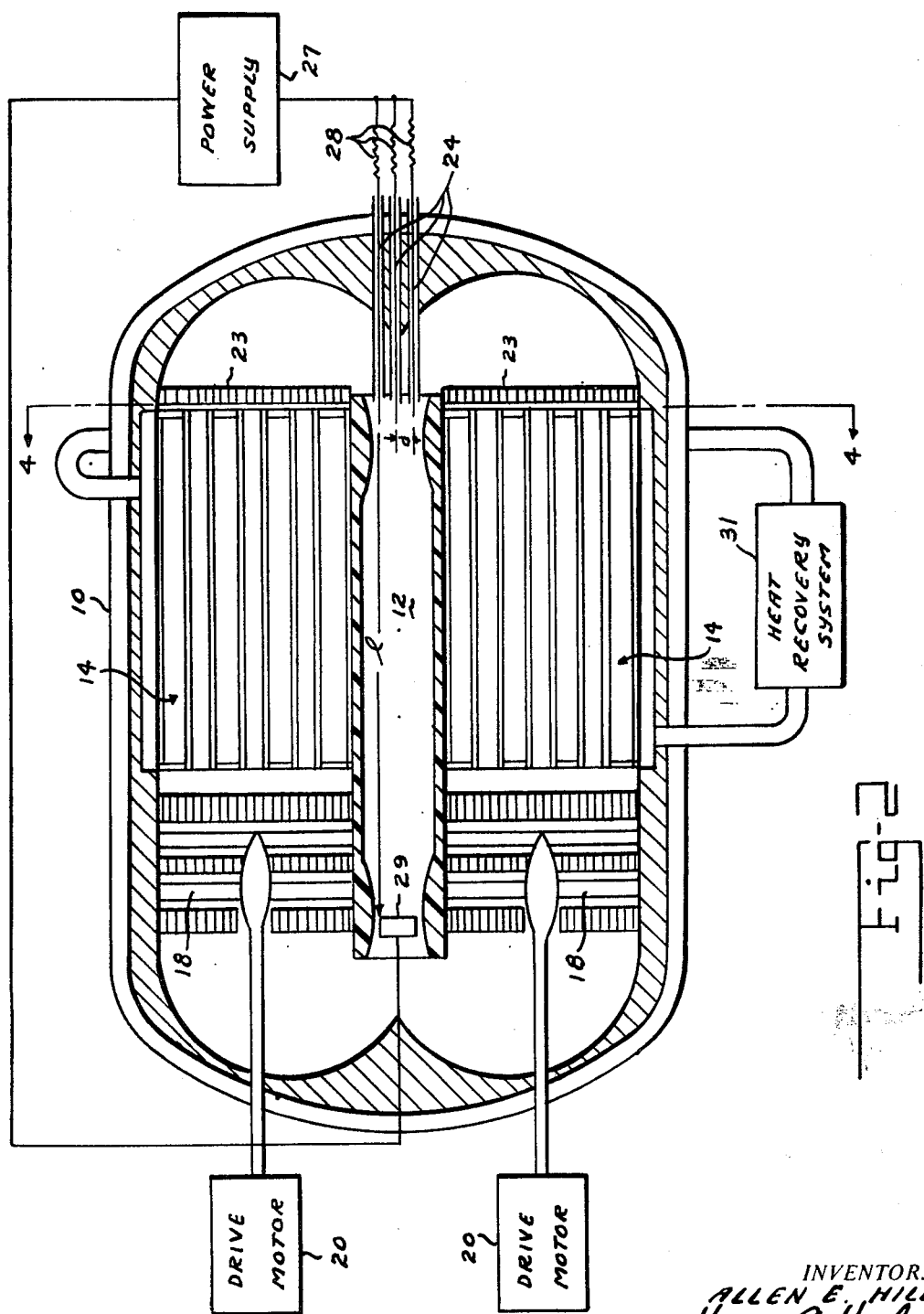

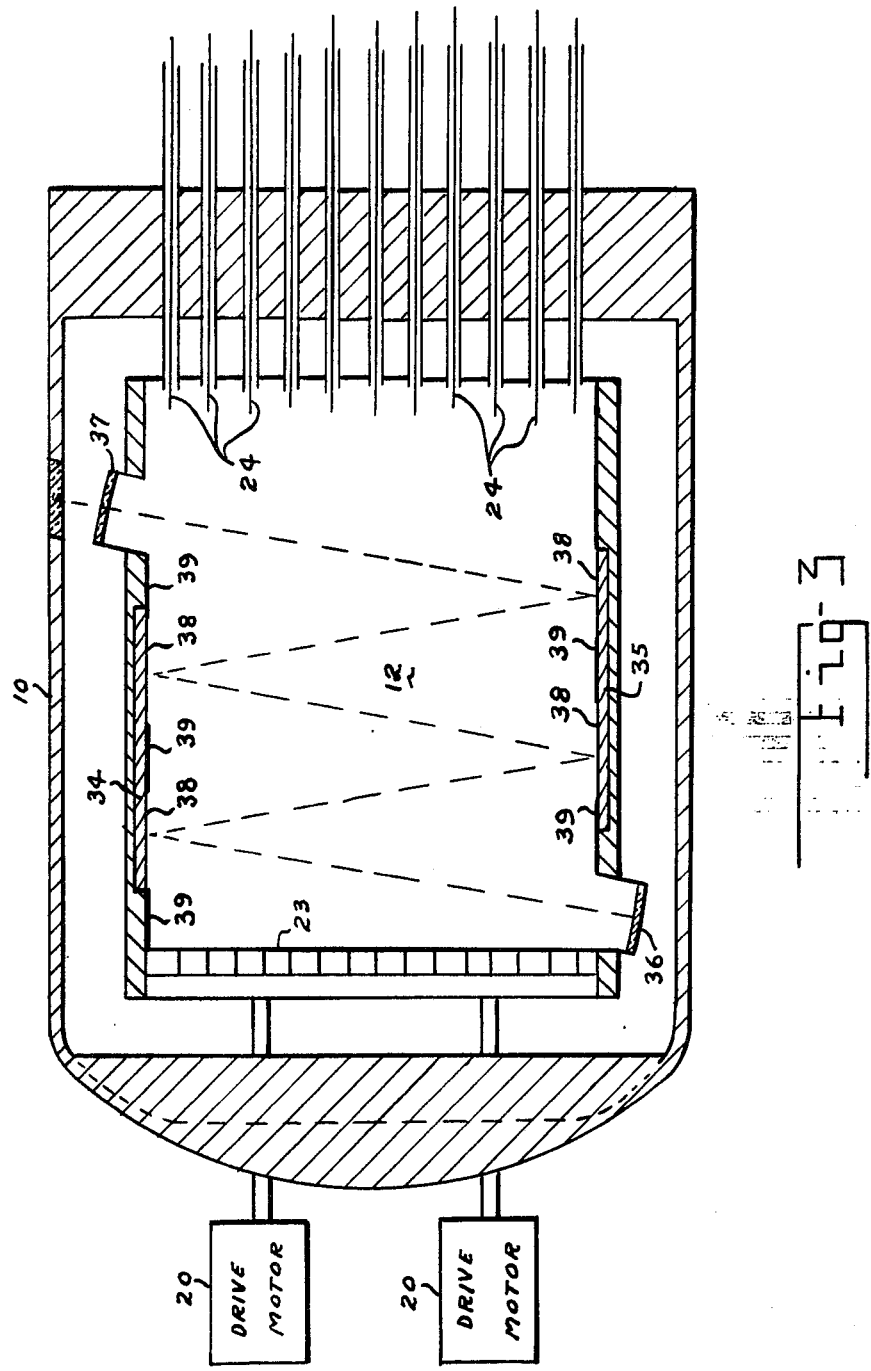

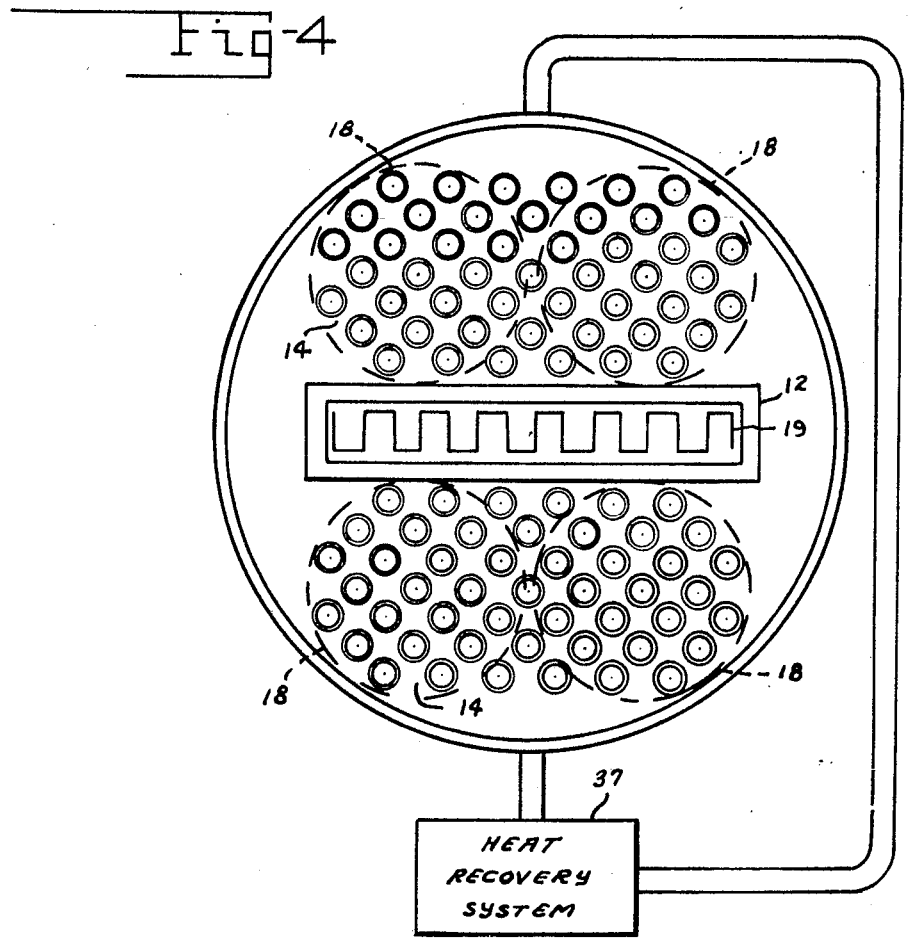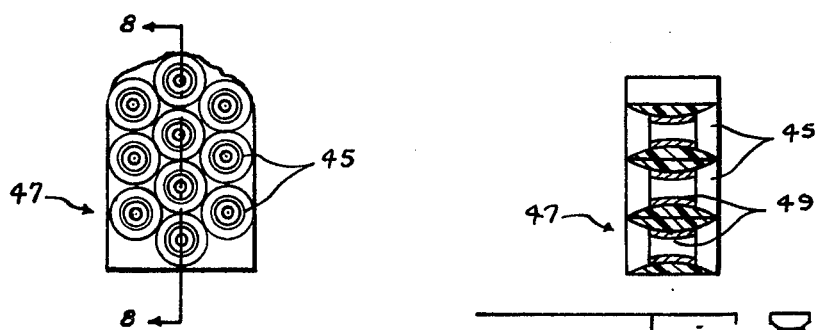

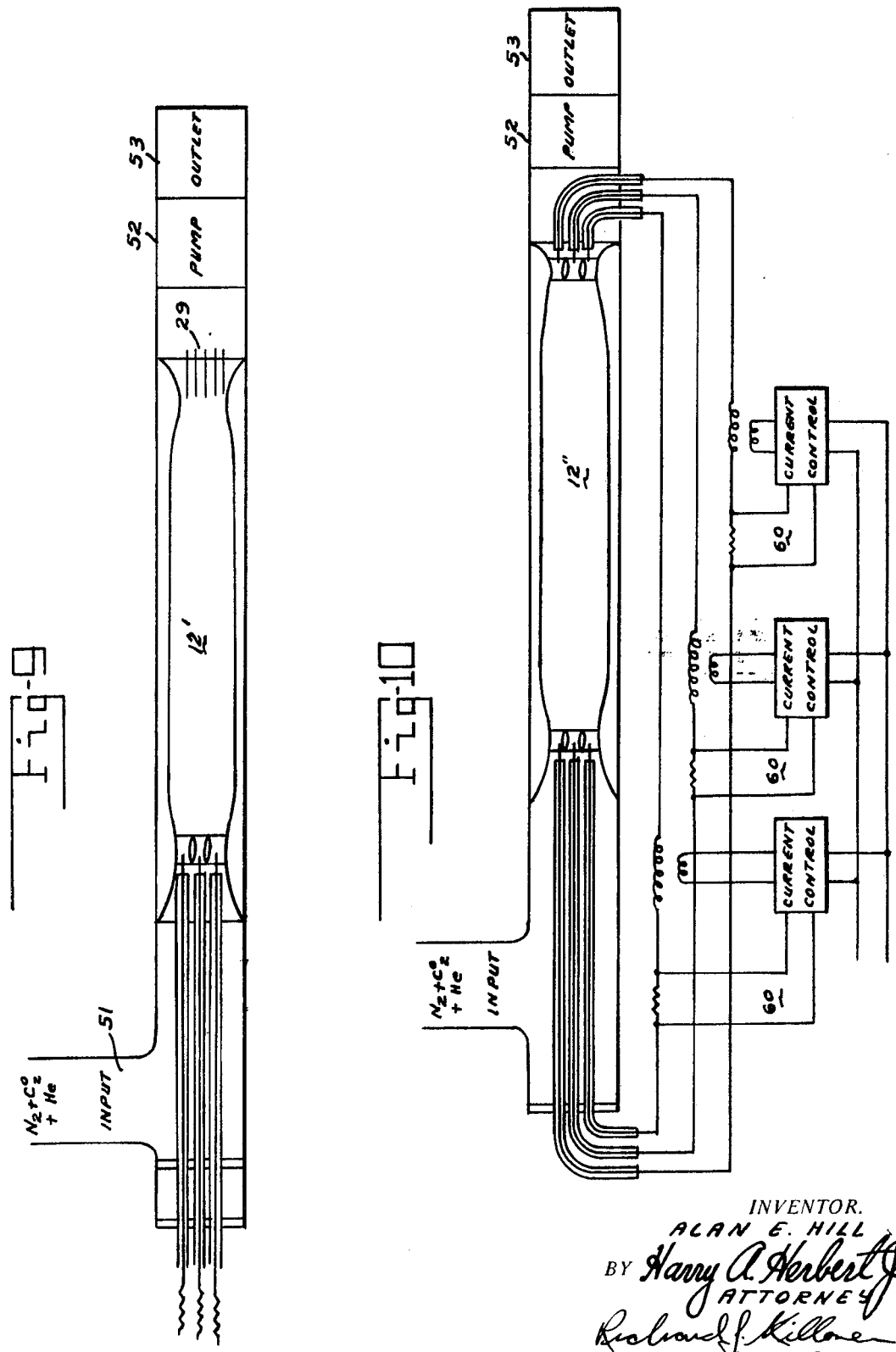

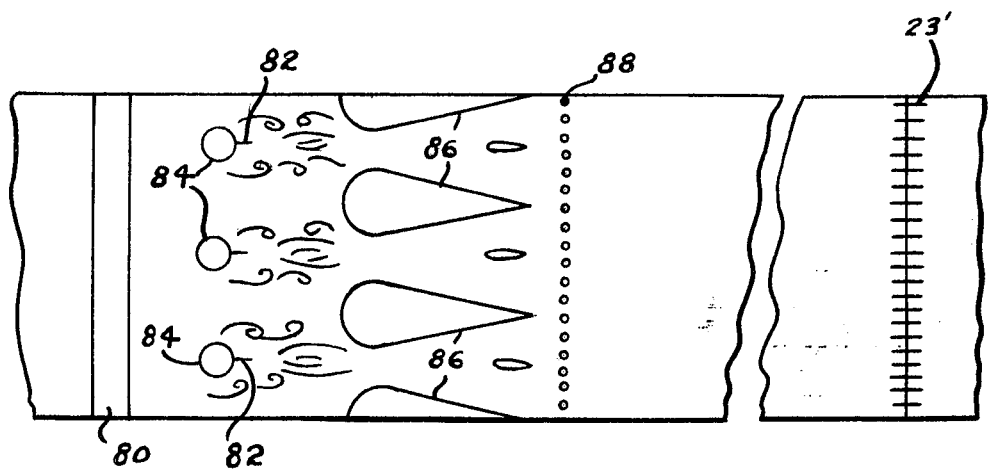

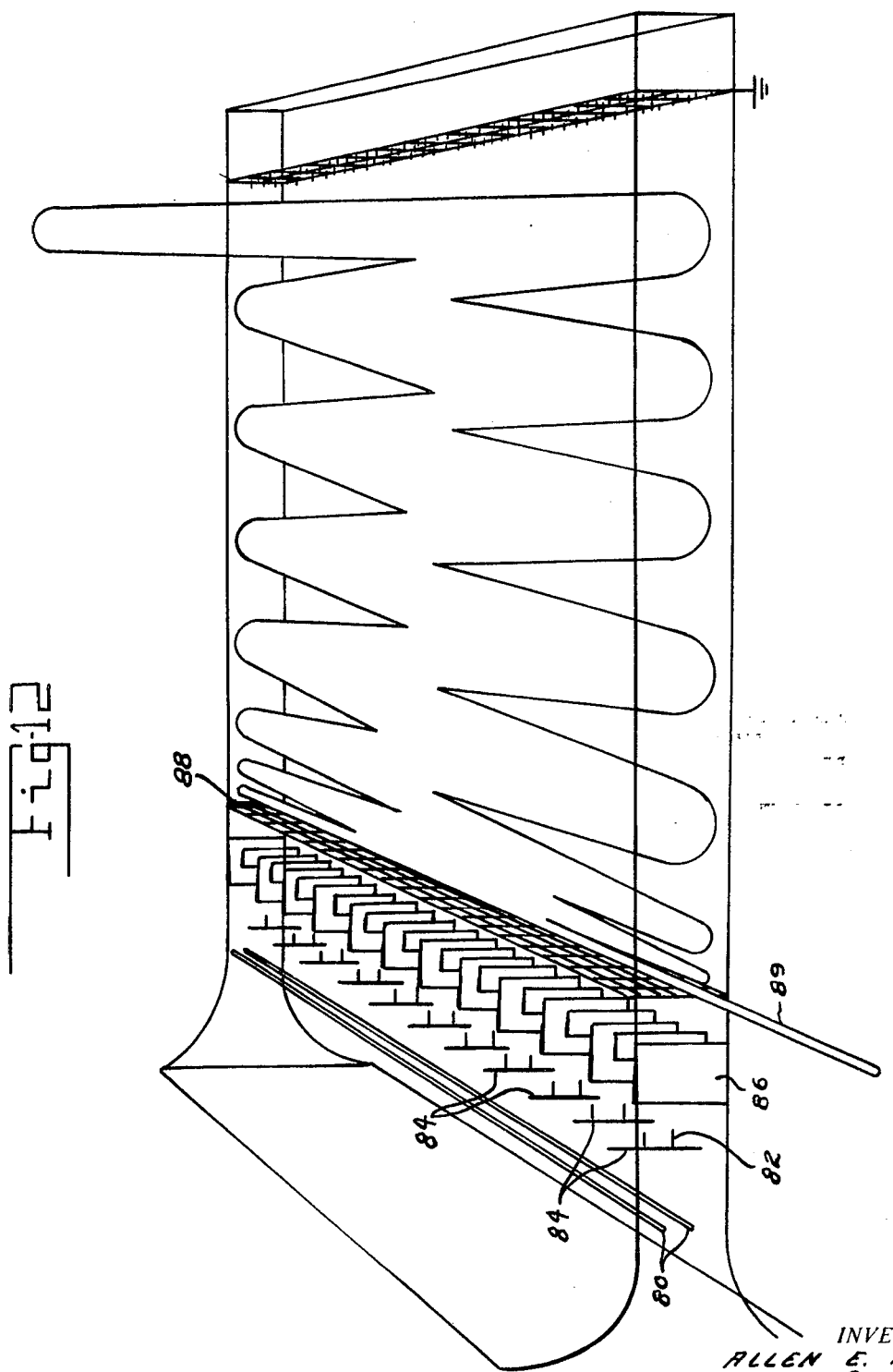

AERODYNAMIC LARGE VOLUME GASEOUS ELECTRIC DISCHARGE SYSTEM

CROSS REFERENCE TO RELATED APPLICATIONS

This is a continuation-in-part of my patent application "Aerodynamic Gas Laser," Ser. No. 7,935, filed Feb. 2, 1970.

BACKGROUND OF THE INVENTION

It is generally impossible to strike a large cross-sectional area discharge between two parallel plates in high pressure gases. Instead, a single arc will be established. The diameter of the arc is restricted by (a) electron emission at the cathode due to bombardment of positive ions, and (b) the electrodynamics of the column; increasing current, increases ionization which decreases the potential gradient and constricts the column. Individually ballasting electrodes could result in spreading the emission at the anode electrode but the individual stream would recombine in space to form a single channel.

Gaseous discharges in high pressure gases greater than 25 Torr normally form a column of finite cross sectional area when placed in containers which generally exceed the mean free path for molecular collisions.

Thus, very long discharge systems, such as used in lasers, have been required to provide high-power output. See, for example, "Scientific American" August, 1968, page 22.

BRIEF SUMMARY OF THE INVENTION

According to this invention use is made of aerodynamic forces to control the ion spacial distribution, and therefore indirectly the electron spacial distribution in large volume discharges.

In one case, an individually ballasted anode array is placed upstream in laminar flow. Anode spacing $d$, flow velocity $\vec{v}_f$, and discharge length $l$ are arranged such that the ions are swept through the channel before they diffuse from one column into an adjacent column, i.e., $d^2/\overline{\lambda c} \simeq 1/\vec{v}_f$. The cathode surface area is chosen such that a normal cathode glow region distributes through its cross section. No external cathode ballast is required. This technique produces multiple column discharges of limited stability.

In the preferred embodiment, a single column diffuse discharge is provided. The latter has been achieved by placing rods upstream of the anodes which shed vorticies around each anode in order to rapidly diffuse the plasma, thus minimizing thermal gradients. A nozzle array placed downstream of the anodes further enhances mixing by driving the flow supersonic, then shocking it back to subsonic. The nozzles are nonconducting so that the individual plasmas are electrically isolated during mixing. After mixing, merger of the individual plasmas produces a single uniform, large volume discharge. The shock produces sufficient plasma uniformity that input power may be increased with pressure or mass flowrate without loss of stability. Following the shock, the discharge remains diffuse during a flow traversal time up to $\tau \simeq 2$ msec, without dependence on further turbulence in this region. Ballast for the separate current discharge streams may be provided by means of the device "Ballast for a Plurality of Parallel Gaseous Discharges" described in inventor's copending application Ser. No. 845,808, filed July 29, 1969.

A laser is provided wherein a transverse folded optical path is also used which makes the use of extremely long laser tubes unnecessary. Thus, lasers with large power outputs and small space requirements are possible.

BRIEF DESCRIPTION OF THE DRAWINGS

FIG. 2 is a partially schematic sectional view of the device of FIG. 1 along the line 2—2;

FIG. 3 is a partially schematic section view of the device of FIG. 1 along the line 3—3;

FIG. 4 is a sectional view of the device of FIG. 1 along the line 4—4 of FIG. 2;

FIG. 7 shows a modified cathode structure for the device of FIG. 1;

FIG. 8 is a sectional view of the device of FIG. 7 along the line 8—8;

FIG. 9 is a partially schematic view of a second embodiment of the invention wherein the gas makes a single pass through the laser chamber; and FIG. 10 shows a partially schematic view of another embodiment of the invention with A. C. excitation.

FIG. 11 is a schematic illustration of another embodiment of the invention.

FIG. 12 is a schematic isometric view of the device of FIG. 11.

DETAILED DESCRIPTION OF THE INVENTION

Figure 1:
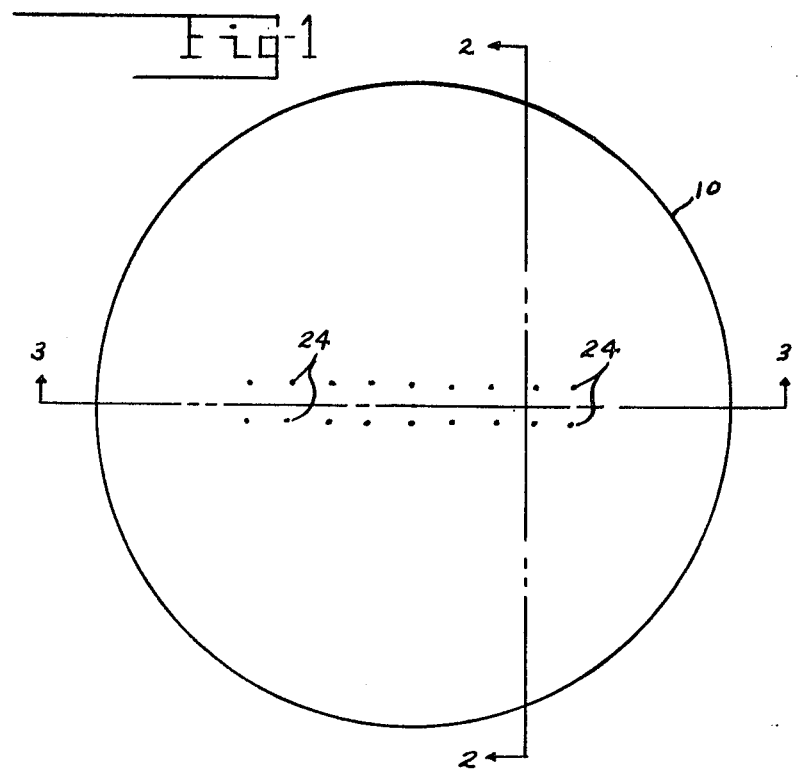
FIG. 1 is a front elevation of an aerodynamic gas laser according to the invention.

Reference is now made to FIG. 1 of the drawing which shows a gas laser 10 having the structure as shown in greater detail in FIGS 2–4.

The gas laser 10 has a laser channel 12 and a heat exchanger section 14. Circulation of a gas through the laser channel is provided by means of four compressor fans 18, two of which are shown schematically in FIG. 2. The fans 18 are driven by motors 20. Guide vanes 23 are positioned adjacent to the output of the heat exchanger to provide substantially laminar flow through the channel 12. Controlled low turbulence conditions may sometimes be permitted in the channel 12, and in some cases it might be preferred. A plurality of anodes 24 are positioned at one end of the laser channel 12 and a cathode 29 is positioned at the other end of the channel 12. The cathode should be designed to provide a grid of cathode glow which substantially covers the entire cross-sectional area of the laser channel. The electrodes 24 and 29 are energized by a power supply 27 with individual current-limiting ballast resistors 28 being provided for the separate discharge paths.

The distance 2d between the electrodes, the gas flow velocity V, and the distance are selected according to the following relation:

$$K(d^2/\overline{\lambda}_m \overline{C}_m) = l/V$$

where $\overline{\lambda}_m$ is the average molecular mean free path;
$\overline{C}_m$ is the mean molecular velocity; and K is a geometrical constant depending upon the particular configuration of the apparatus and its value will be between 0.1 and 1.

In a closed cycle system, the velocity V should be maintained in the subsonic range so that compression or acceleration of the gas is unnecessary.

A cooling liquid, such as water, is supplied to the heat exchanger 14. The heat from the heat exchanger unit 14 may be used in a heat recuperation unit 31 which makes use of the heat in any well-known manner such as in the power generation system to drive the fans 18.

The optical system for the laser is shown in FIG. 3. A transverse folded optical path is provided as shown. Flat mirrors 34 and 35 are positioned on opposite sides of the discharge path with a totally reflecting mirror 36 positioned at one end of the folded optical path, and a partially reflective mirror 37 provided at the output end of the optical path. While five crossings are shown in the folded path, the mirrors 36 and 37 may be positioned to provide a different number of crossings, for example, seven or nine.

Nonreflecting areas 39 are provided on the mirrors to prevent internal parasitic oscillations or stray reflections. This may also be prevented by locating reflecting mirrors only in areas indicated at 38.

Figure 5:
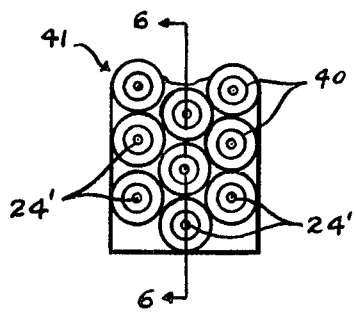
FIG. 5 shows a modified anode structure for the device of FIG. 1.
Figure 6:
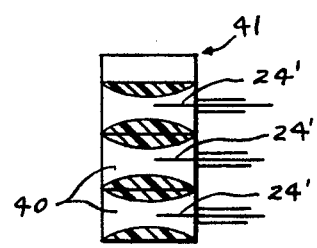
FIG. 6 is a sectional view of the device of FIG. 5 along the line 6—6.

Other electrode configurations than those thus far described may be used, for example, the anode structure may be made up of a plurality of tapered channels 40 in an insulator 41 with anodes 24' projecting into the channels 40 as shown in FIGS. 5 and 6 wherein the flow velocity is increased at the anodes by reducing the cross-sectional area and then expanding into the laser channel, thus requiring fewer electrodes and permitting more complete volume filling in the laser channel.

Various cathode structures could also be used, for example, such as shown in FIGS. 7 and 8. Tapered openings 45 may be provided in an insulating sheet 47 with cathode material 49 located in each of the openings.

Also channel configurations other than that shown may be provided, for example, the channel can be rectangular, as shown, or it can be cylindrical or it can have an annular shape. With the annular channel, the folded path would be in the direction of flow. In this case, two annular rows of mirrors could be used with the outer mirror at the first end directing the beam to the inner mirror at the second end with the beam then being directed to the inner mirror at the first end, and then to the next outer mirror at the second end and so on around the annular channel to the output in the same manner as in the system as described above. The annular gaseous discharge channel could also be used to test equipment within a uniform plasma discharge, such as might be used for reentry simulation.

Also a tapered channel may be used to keep the velocity constant as heat is added so that subsonic flow approaching Mach 1 can be used in the laser channel.

In one device constructed and operated, the laser channel 12 was 6 inches long, 1 inch high and 6 inches wide. V was 95meters/sec, d was 0.69 cm, $\overline{\lambda_m}$ was $2\times10^{-5}$meters, $\overline{C_m}$ was $1.48\times10^3$meters/sec, and K was approximately equal to 1. The gas used was a mixture of $CO_2$ at a partial pressure of 1.5 torr, $N_2$ at a partial pressure of 1.5 torr and He at a partial pressure of 4 torr.

In the operation of the device, the compressor fan establishes a gas flow below Mach 1 in the closed system. Ions produced in the space between the anodes and the cathodes are swept toward the cathode by the gas flow. The distance between the anode electrodes is selected such that the diffusion time from one stream to the next is of the order of the transit time from the anodes to the cathode.

The device may be operated either as a laser oscillator or a laser amplifier. When operated as an oscillator, stimulated emission is reinforced in the optical cavity by internal feedback with aligned mirrors in a manner well known in the laser art, or with an external optical feedback system. Amplifier operation could be in the manner known in the laser art. Also, the device may be operated either as a pulsed laser or as a continuous wave laser.

While a closed system has thus far been described, it is possible to use a system wherein the gas makes a single pass through the laser channel, as shown in FIG. 9. The laser channel 12' is substantially as described in FIGS. 1–4. Individual cathodes 29 may be provided, if desired. The cathodes 29 and the anodes 24' may be of the type previously described with respect to FIGS. 5 and 7. The optical system, not shown, would be as in FIG. 3. The laser gas would be admitted at input 51, drawn through the system at the desired velocity by means of a pump 52, and released to the atmosphere at outlet 53. Outlet 53 may lead to a gas recovery system, if desired. The gas could be supplied under pressure at 51 and expanded to a lower pressure in a nozzle before entering the channel 12'. The gas would then be released to the atmosphere through a diffuser in the normal manner. The operation would be substantially as described above except that the gas would not pass through an internal heat exchanger, and supersonic flow may be used.

Alternating current excitation may be provided in a device such as shown in FIG. 10, with a laser channel 12" similar to that shown in FIG. 9. In this device, separate electrodes are provided at both ends of the laser channel 12". Gas flow through the channel would be as in FIG. 9. A feedback current control circuit 60 would be provided for each pair of electrodes to limit the current in the different discharge paths.

Uniform large volume gaseous discharges, such as may be used in lasers, may be provided as shown in FIG. 11. In this device, horizontal rods 80 are placed upstream of anodes 82 which are secured to vertical rods 84. Rods 80 and 84 shed vortices to rapidly diffuse the plasma. Further mixing then takes place in the nozzle array 86. To further aid in the mixing, the flow upstream of the nozzles can be driven supersonic with the pressure ratio across the nozzles selected to shock it back to subsonic. The pressure ratio, to provide shocking, can be provided either by increasing the pressure upstream or by decreasing the pressure downstream of the nozzles, or a combination of both, by use of a pump. The nozzle structure 86 is made of a nonconducting material, such as a plastic so that the plasmas in the separate nozzles are electrically isolated during mixing. Though not needed for all applications, a screen 88 may be provided downstream of the nozzles to provide a more uniform optical properties in the discharge column. For laser operation a transverse folded path, described with respect to FIG. 3, may be provided, as shown schematically in FIG. 12. In the growth region of the beam for amplifier operation the mirrors can be located closer together, as illustrated. Input light beam 89 will be amplified within the system in the conventional manner.

Even when shocking in the nozzles is not provided, the nozzles by themselves act to provide a more uniform discharge.

The systems described may be used to provide a uniform low power discharge which is insufficient to pump the laser, or to overheat the gas media. This provides a weakly ionized uniform plasma which may then be pulsed to provide a complete uniform breakdown and subsequent laser pumping. The pulsing could be provided between existing electrodes, or special electrodes for this purpose could be provided. These electrodes need not be aligned in the same direction as the existing electrode configuration. This device can then be used as a rapid pulse laser or a single pulse laser.

The gas used in the system may be, for example, a mixture of He, $N_2$ and $CO_2$ as described in the article "High-Power Carbon Dioxide Lasers," pages 23-33, of Scientific American, August, 1968. However, other known laser gas may also be used.

There is thus provided a high-power gaseous discharge system which is more compact than prior art systems, wherein ballast means and aerodynamic control are used to permit the excitation of a large volume.

I claim:

1. A laser system having a large volume discharge in a gaseous medium having a pressure greater than 25 Torr; comprising means, for forming an at least partially enclosed chamber; a gaseous lasing medium contained therein; means, including a plurality of electrodes at one end of said chamber and at least one electrode at the other end of said chamber for establishing a plurality of separate discharges within said chamber to provide a population inversion in the gaseous medium; said means, for establishing separate discharges within said chamber, including means for providing an individual ballast for each of said discharges; means for aerodynamically controlling the spacial distribution of charge and temperature within the chamber; said last named means including means for providing a flow of said gaseous medium through said channel; and means for optically extracting a coherent beam of energy from said channel; means upstream of said plurality of electrodes for creating vortices adjacent the plurality of electrodes to rapidly diffuse the plasma, and an array of converging diverging nozzles downstream of said anodes to further provide a homogeneous discharge plasma.

2. The device as recited in claim 1 including means for providing shocking in the nozzles whereby mixing is further enhanced.

3. A laser system, comprising: means forming an enclosed space; a gaseous medium in said enclosed space having a pressure greater than 25 Torr; a channel member within said enclosed space; a plurality of individual electrodes extending into one end of said channel member with an interelectrode spacing $2d$; at least one electrode, at the other end of said channel, spaced from said plurality of electrodes a distance $l$; means for establishing separate discharges between the plurality of electrodes at one end of the channel and said at least one electrode at the other end of the channel; for providing a population inversion in the gaseous medium; said means including means for providing an individual ballast for each of said discharges; means for providing a flow of gaseous lasing medium through said channel with a predetermined velocity V where the ratio $$l/V = K\ (d^2/\overline{\lambda_m}\ \overline{C_m})$$

where $\overline{\lambda_m}$ is the average molecular mean free path,
$\overline{C_m}$ is the mean molecular velocity, and
$K$ is a geometrical constant depending upon the configuration of the apparatus, where the distance $2d$ between the individual electrodes of said plurality of electrodes is such that the diffusion time from one stream to the next is of the order of the transit time over the distance $l$ from the plurality of individual electrodes to the at least one electrode; means for optically extracting a coherent beam of energy from said channel.

4. The device as recited in claim 3 wherein said means for optically extracting energy from said channel includes a folded optical path substantially perpendicular to the direction of gas flow in said channel.

5. The device as recited in claim 4 including a totally reflecting mirror at one end of said folded optical path and a partially-transmitting-partially-reflecting laser output mirror at the other end of said folded optical path.

6. The device as recited in claim 5 including a gas recirculation path, for said gas lasing medium, within said enclosed space; a heat exchanger in said recirculation path; said means for providing a flow of gaseous lasing medium being a plurality of motor-driven fans positioned adjacent said heat exchanger; means, adjacent the output of said heat exchanger for providing a substantially laminar flow of gaseous medium through said channel.

7. The device as recited in claim 6 wherein said means for providing a folded optical path includes in addition to the totally reflecting mirror, and the partially-transmitting-partially-reflecting mirror, additional mirror means for reflecting light across said discharges a plurality of times.

8. The device as recited in claim 7 including means for blocking parasitic oscillations and stray reflections within the laser channel.

9. The device as recited in claim 8 wherein said at least one electrode comprises a sheet of insulating material; a plurality of tapered passages through said sheet aligned with said plurality of individual electrodes and cathode emitting material positioned within said passages for permitting discharges to be set up between the plurality of individual electrode and the cathode emitting material within the tapered passages.

10. The device as recited in claim 8 including a sheet of insulating material; a plurality of tapered openings in said sheet having the smallest diameter in the center of the sheet and one of said plurality of electrodes projecting into each of said openings.

11. The device as recited in claim 3 wherein said at least one electrode comprises a sheet of insulating material; a plurality of tapered passages through said sheet, and cathode emitting material positioned within said passages.

12. The device as recited in claim 11 including a sheet of insulating material; a plurality of tapered openings in said sheet having the smallest diameter in the center of the sheet and one of said plurality of electrodes projecting into each of said openings.

13. The device as recited in claim 3 wherein said means for supplying said gaseous lasing medium to said channel is located at the end adjacent said plurality of electrodes; said means for providing a flow through said channel being a gas pump adjacent the end of said channel remote from said gaseous lasing medium supplying means.

14. The device as recited in claim 3 including a plurality of electrodes at said other end of said channel; said means for establishing separate discharges being an A. C. supply means connected between said plurality of electrodes at said one end of said channel and said plurality of electrodes at the said other end of said channel and means for controlling the current flow in the separate discharges.

15. The device as recited in claim 2 wherein said means for optically extracting energy from said chamber includes a folded optical path substantially perpendicular to the direction of gas flow in the chamber.

* * * * *